D. GESSNER.
APPARATUS FOR TREATING CLOTH.
APPLICATION FILED AUG. 4, 1908.
994,075.
Patented May 30, 1911.
10 SHEETS—SHEET 1.
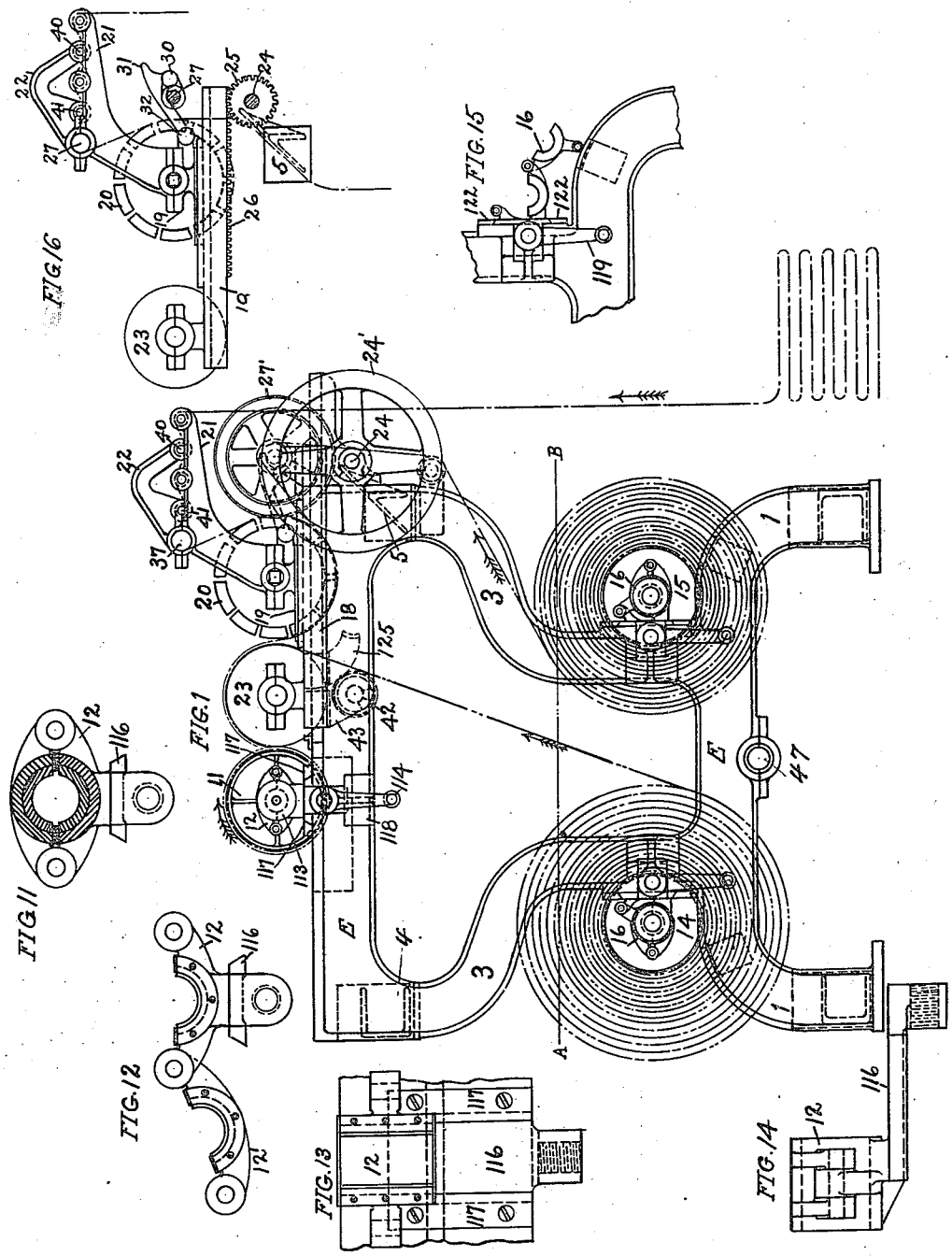
WITNESSES
J. E. Hardenbergh, Jr.
Oscar Ascher
INVENTOR
David Gessner
by Gifford & Bull ATTYS.

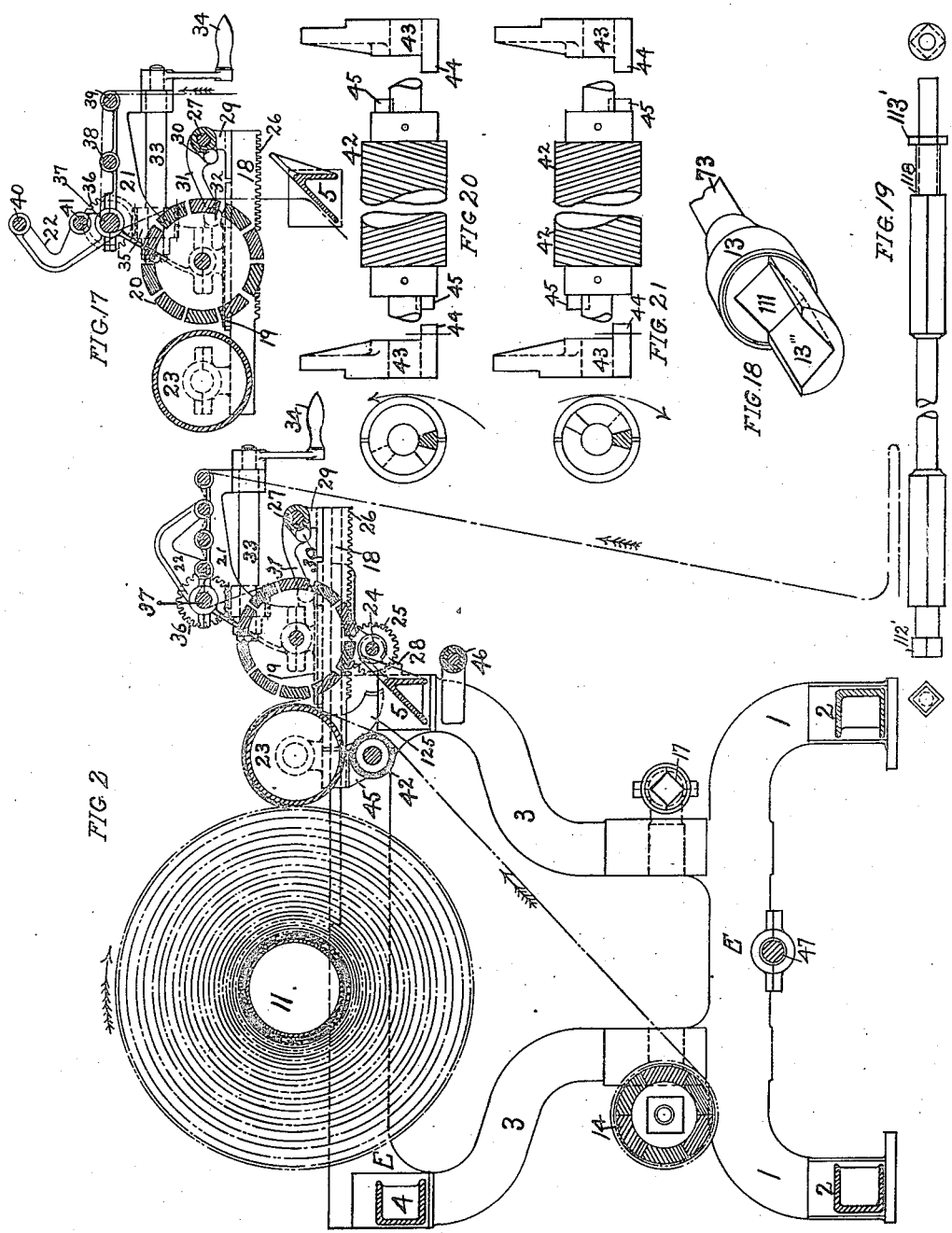

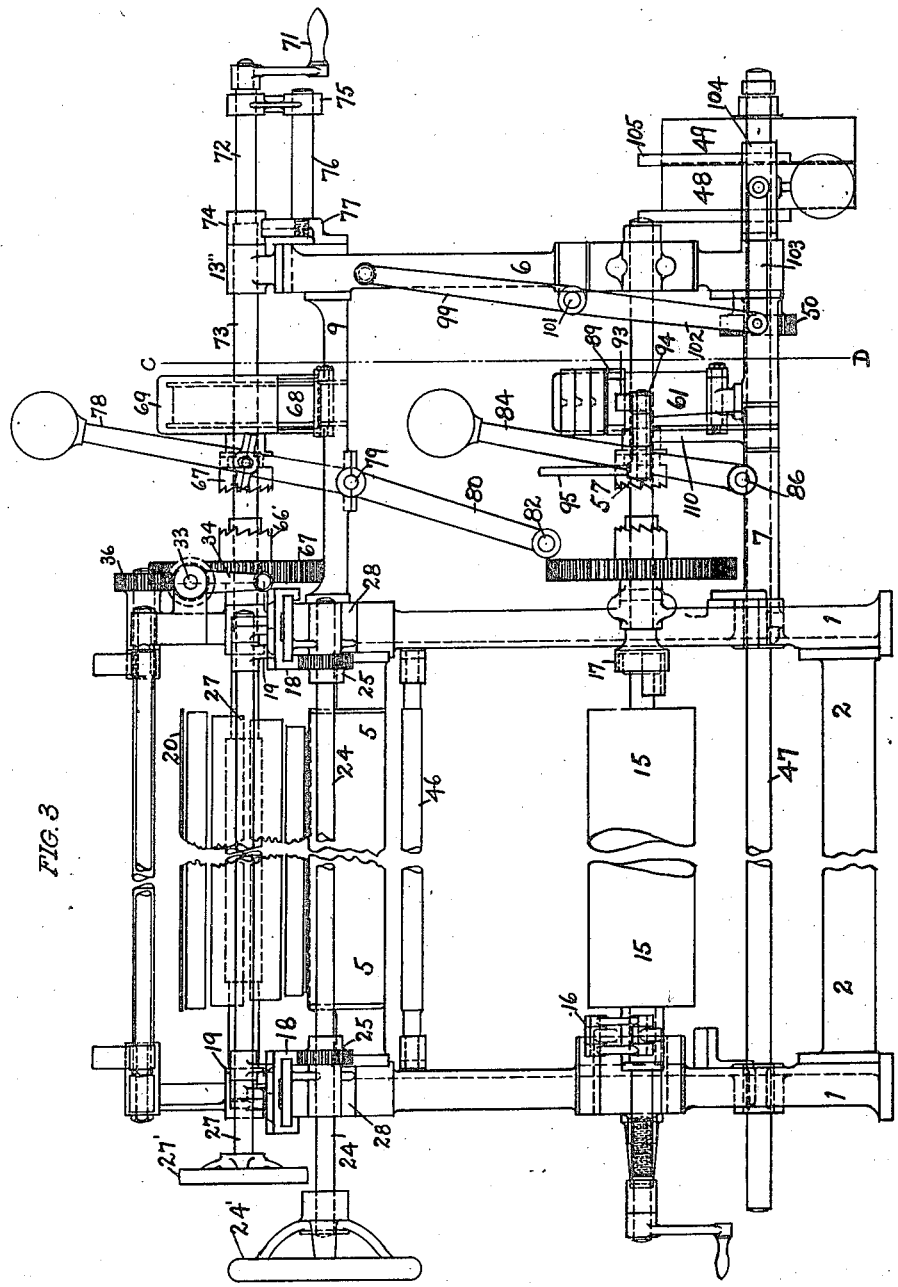

D. GESSNER.
APPARATUS FOR TREATING CLOTH.
APPLICATION FILED AUG. 4, 1908.
994,075.
Patented May 30, 1911.
10 SHEETS—SHEET 4.
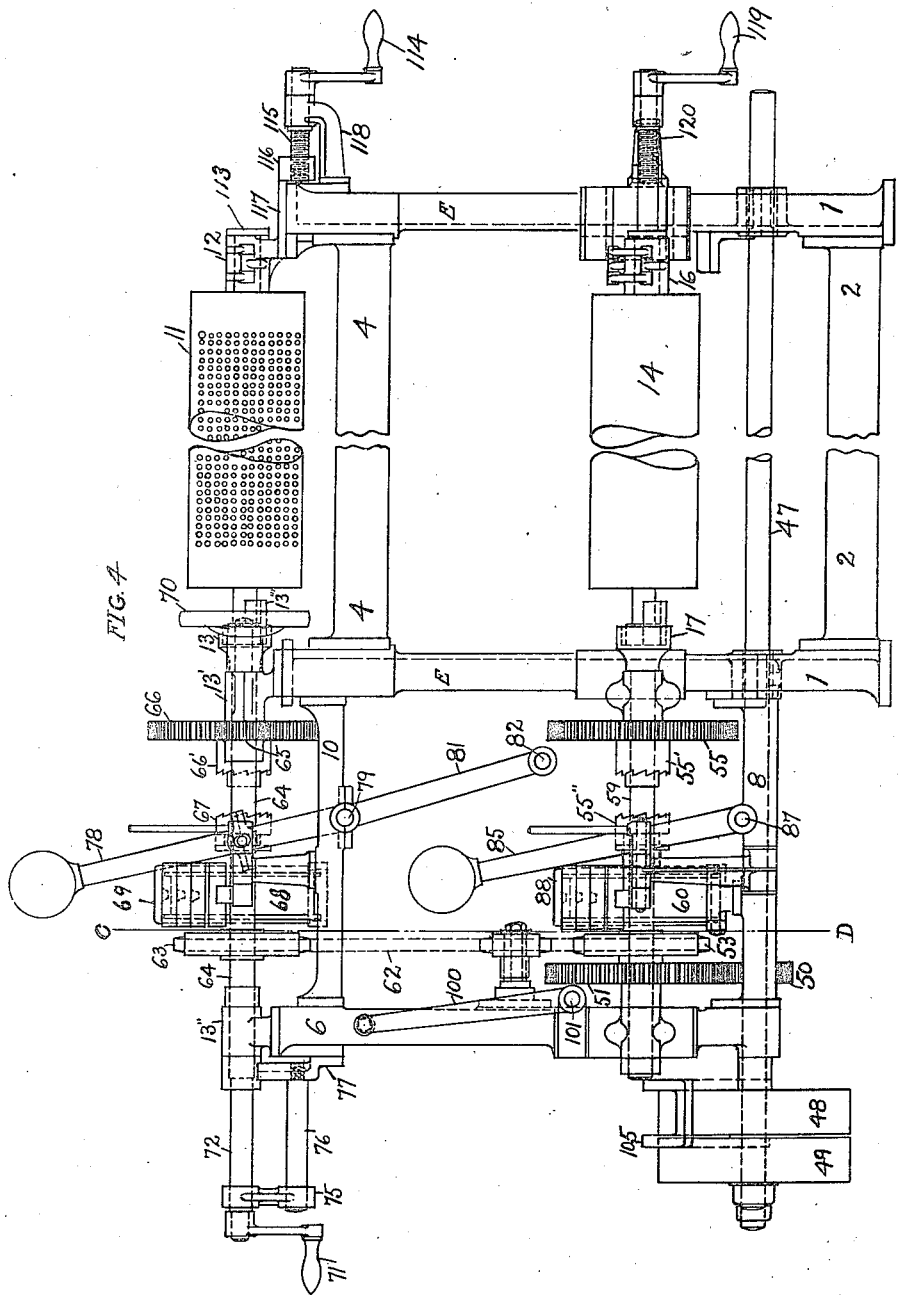

D. GESSNER.
APPARATUS FOR TREATING CLOTH.
APPLICATION FILED AUG. 4, 1908.
994,075.
Patented May 30, 1911.
10 SHEETS—SHEET 5.
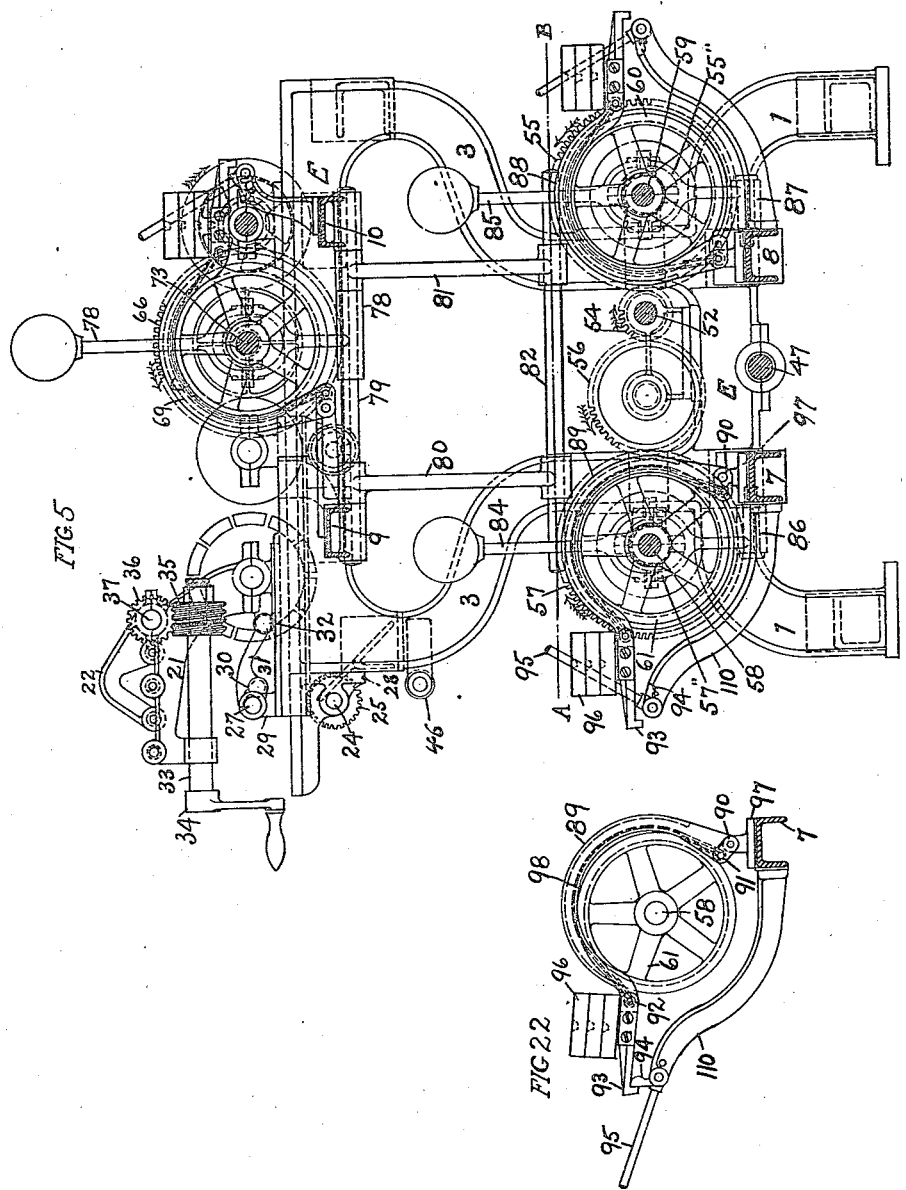
WITNESSES
J. E. Hardenbergh, Jr.
Oscar Ascher
INVENTOR
David Gessner
by Gifford & Bull ATT'YS.

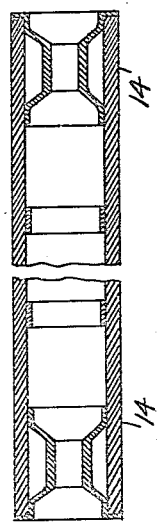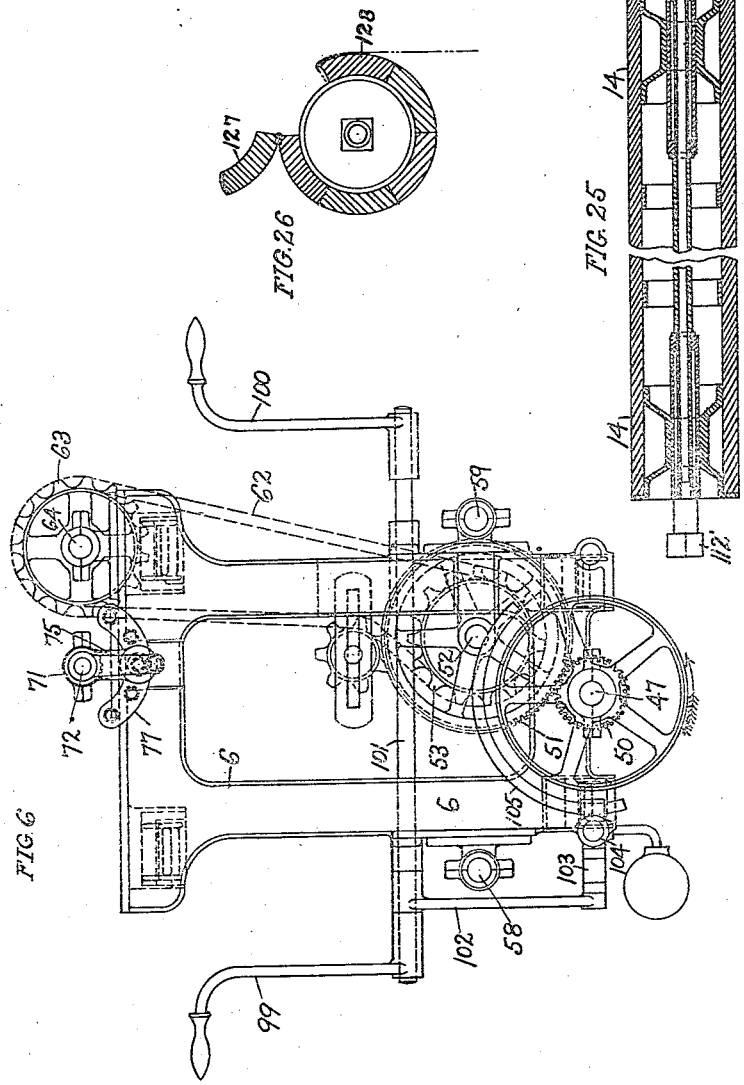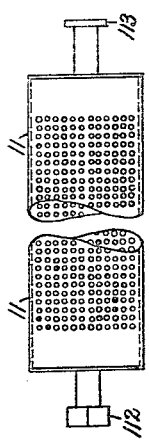

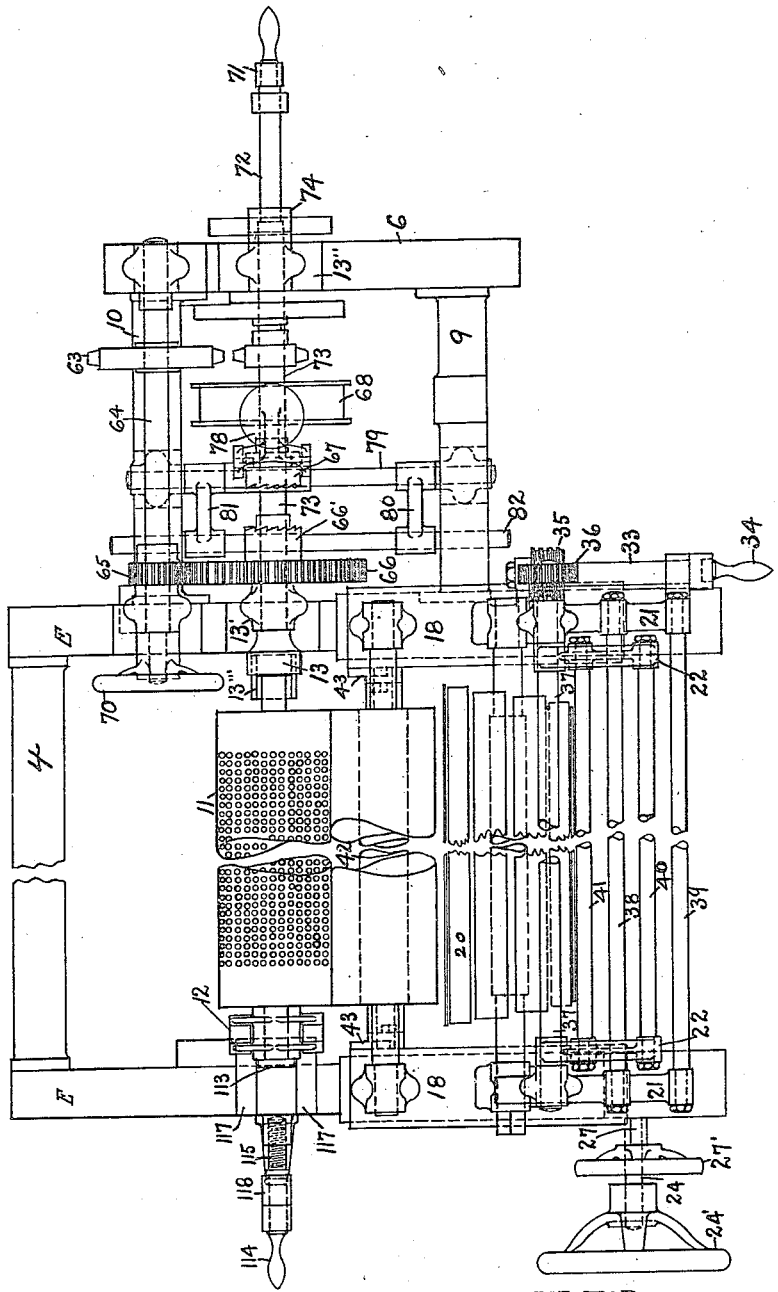

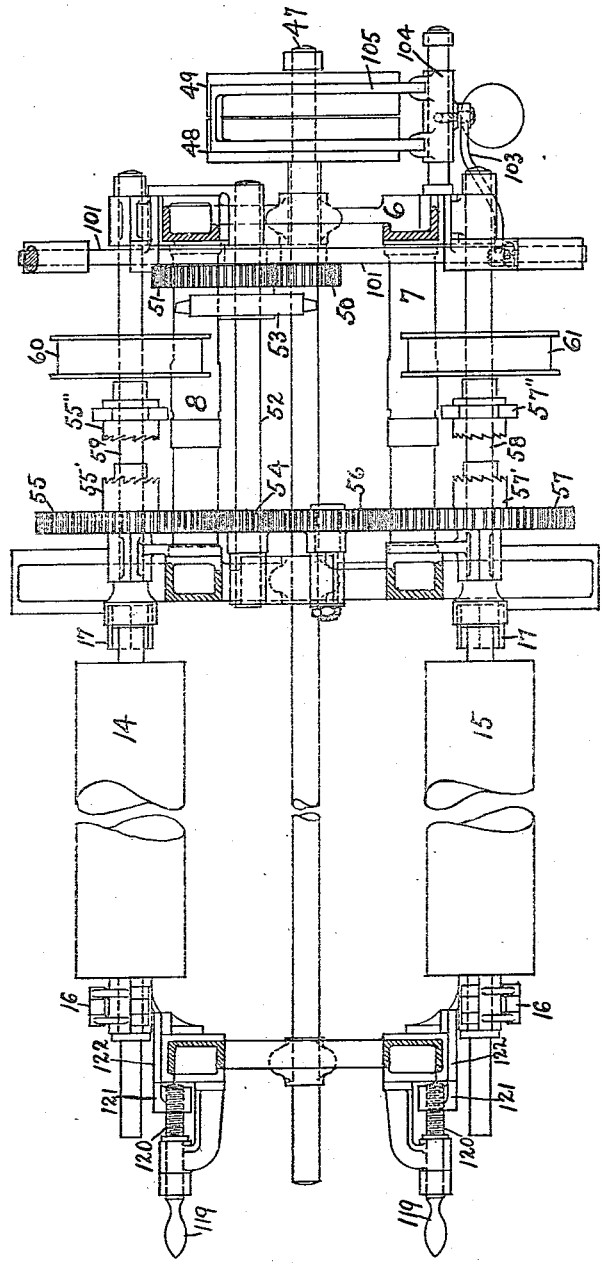

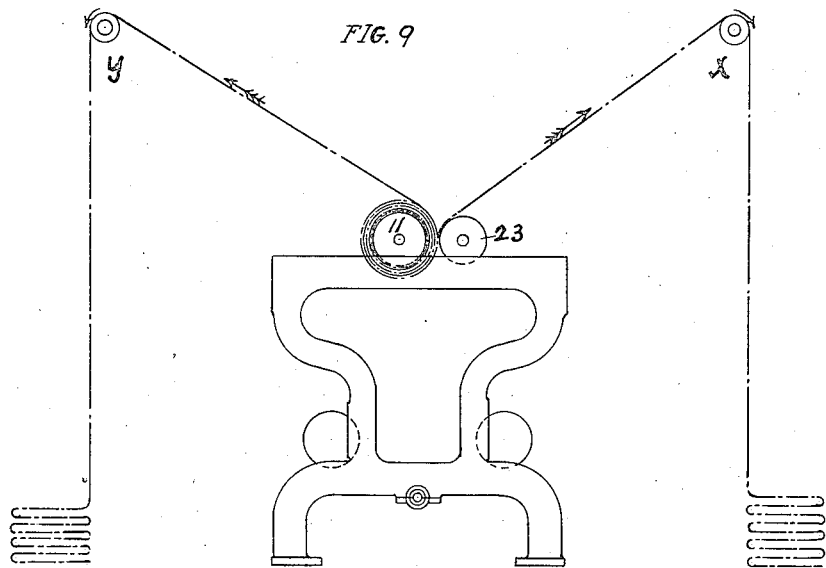
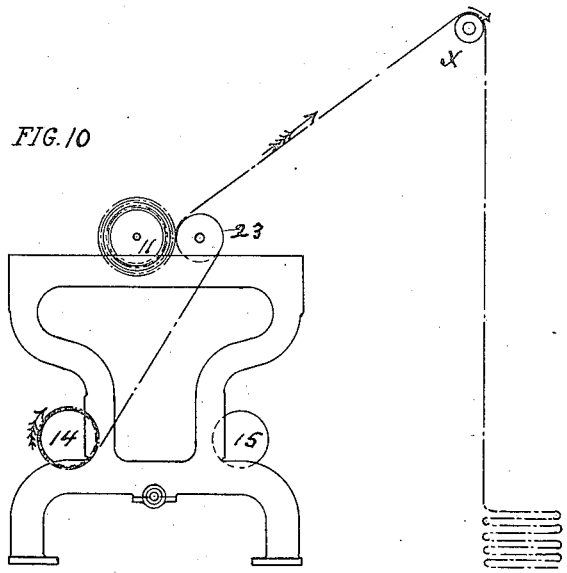

D. GESSNER.
APPARATUS FOR TREATING CLOTH.
APPLICATION FILED AUG. 4, 1908.
994,075.
Patented May 30, 1911.
10 SHEETS—SHEET 10.
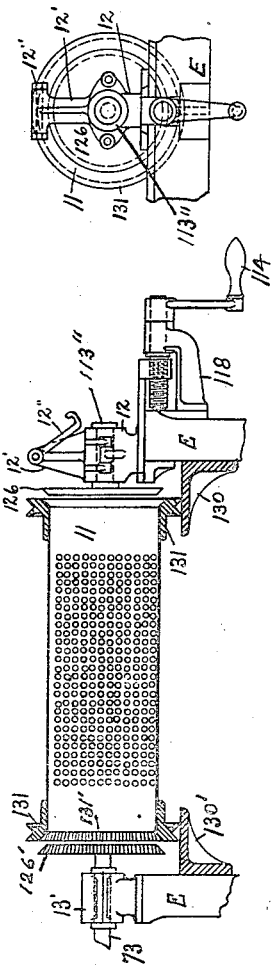
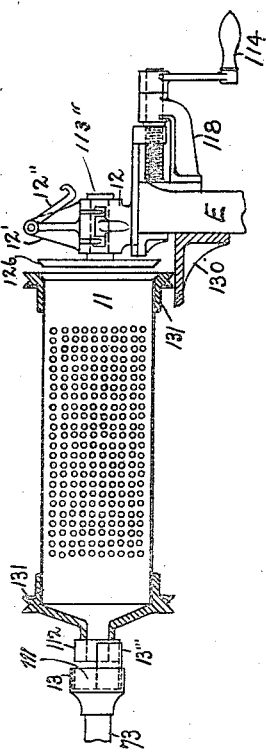

UNITED STATES PATENT OFFICE.

DAVID GESSNER, OF WORCESTER, MASSACHUSETTS.

APPARATUS FOR TREATING CLOTH.

994,075.  Specification of Letters Patent. Patented May 30, 1911.

Application filed August 4, 1908. Serial No. 446,958.

*To all whom it may concern:*

Be it known that I, DAVID GESSNER, a citizen of the United States, and a resident of Worcester, county of Worcester, and State of Massachusetts, have invented a new and useful Improvement in Apparatus for Treating Cloth, of which the following is a specification.

My invention consists of a machine for winding or rolling cloth producing improved results in two directions. First, a more compact, uniform and in other respects better roll is produced. Second, it is produced expeditiously and with maximum convenience and saving of labor.

The invention consists in the construction, combination and arrangement of parts set forth in and falling within the scope of the appended claims.

Figure 1 is an end view of my machine showing the hand wheels for operating the carriages. Fig. 2 is a cross section through the center of the machine. Fig. 3 is a front view of the machine. Fig. 4 is a rear view of the machine. Fig. 5 is a sectional view of the machine taken on line C, D, of Fig. 3. Fig. 6 is an end view of the yoke with the driving pulleys and shipper for same. Fig. 7 is a top plan view of the machine. Fig. 8 is a horizontal sectional view on the line A, B, of Figs. 1 and 5. Figs. 9 and 10 are diagrammatic views showing methods of unwinding either two pieces of cloth or a piece of cloth and apron after the former has been steamed. Figs. 11 to 15, inclusive, are details of the bearings for the lap-roll and steaming-roll. Figs. 16 and 17 are side view and cross section, respectively, of the duplex carriage carrying the pressure roll, stretcher roll and friction device for the cloth. Fig. 18 is a detail of the socket shaft with the projecting shelf or receiving guide. Fig. 19 shows a carrier shaft for the apron and cloth rollers used with my machine. Figs. 20 and 21 show portions of the apron-spreader or scroll-roller with its reversely acting scrolls. Fig. 22 is a detail of the friction brake used in connection with the lap or steaming rolls. Fig. 23 shows a steaming roll. Fig. 24 is a longitudinal cross section of a lap-roll. Fig. 25 is a longitudinal cross section of a lap-roll and its carrier shaft. Fig. 26 is an end view of a lap-roll with one of its cover lags turned back. Figs. 27, 28 and 29 are details showing two different steaming cylinders and the manner of mounting them.

Referring now to the accompanying drawings in detail, E indicates as a whole the frame of the machine, which frame when constructed as herein shown is particularly adapted for the purposes of the invention. This frame comprises the base or feet members 1, 1, connected by the ties 2, 2; the vertical curved standards 3 diverging outward near their upper ends to form a proper support for the carriages and rolls.

4 and 5 indicate ties or girds connecting the standards at their upper end portions. To the frame E of the machine is secured the yoke 6 (Fig. 6) by means of the ties 7, 8, 9 and 10; this yoke carrying certain of the end bearings and shifting devices of the driving gear of the machine.

The bearing 12 and socket 13 receive the roller 11 which latter may be either a perforated steaming cylinder (as shown, for instance, in Fig. 23) or an ordinary lap-roll upon which the cloth or apron, or both, may be wound, as shown in Figs. 24, 25 and 26.

14 and 15 are apron or cloth-rolls upon which an apron or the cloth may be wound or unwound, these rollers 14 and 15 being carried by bearings 16 and sockets 17.

Upon the top of frame E is mounted a sliding carriage 18 which, in turn, carries the second sliding carriage 19, the latter, upon its upper portion carries bearings for the stretcher roll 20 and friction rod brackets 21 and 22, while the carriage 18 itself carries a delivery or pay-out roll which may be in the form of a presser roll 23. The stretcher roll 20 specifically forms no part of my present invention and the same is preferably of the construction shown in my Letters Patent No. 546,762, dated September 24, 1895.

24 is a shaft carried in brackets 28 (Figs. 2 and 5) which shaft carries hand wheel 24' and pinions 25, 25, which mesh with the teeth of the rack 26 of the carriage 18.

27 is a shaft revolving in brackets 29 upon the carriage 18 and carrying hand wheel 27', and at each end shackle-cams 30, to which are linked one end of connecting arms 31, the opposite end being connected at 32 to the supplemental carriage 19 carrying the stretcher roll and friction-bar brackets. The friction-bar bracket 21 carries on one side, namely; the driving end of the machine, a shaft 33 which upon one end carries a handle 34 and at the opposite end a worm 35 engaging with the worm wheel 36 upon the inside friction-bar 37, upon which are keyed the friction-bar brackets 22.

38 and 39 are friction-bars upon bracket 21, and 40 and 41 are friction-bars upon bracket 22.

42 is a scroll roller mounted in bearings 43, which are provided with stops 44 for the lugs 45, carried by the scroll-roller 42. This roll has a downwardly running scroll, as shown in Fig. 20, and an upwardly extending scroll, as shown in Fig. 21. 46 is an idler below the gird 5.

47 is a driving shaft carrying fast and loose pulleys 48 and 49, on outside of yoke 6. Just inside of yoke 6, the driving shaft carries a pinion 50 which meshes with and drives the gear 51 above it. The gear 51 (Fig. 8) is keyed to the shaft 52 which has fast therewith the sprocket 53, and pinion 54, meshing on one side into gear 55, and upon the other side into the intermediate gear 56, which in turn meshes with gear 57 upon shaft 58. The gear 55 with a saw-tooth clutch 55', fast therewith, revolves loosely upon the shaft 59, and the gear 57, with half of a clutch 57' moves loosely upon the shaft 58. The shaft 59 has keyed therewith the sliding clutch 55" which meshes with the clutch member 55', and the shaft 58 carries clutch member 57", which may mesh with clutch member 57' of the gear 57. The shaft 59 also carries a friction pulley 60 and shaft 58 carries friction pulley 61. The sprocket 53 imparts motion through drive-chain 62 to sprocket 63, upon the shaft 64 mounted upon the top of the yoke 6 of the frame E (Figs. 4 and 6). The shaft 64 also carries the pinion 65 (Fig. 7) which meshes with the gear 66 on the shaft 73, having fast therewith the clutch member 66'. 67 is a second clutch member meshing with 66'. Behind the clutch member 67 is the friction pulley 68, which is covered by a friction-strap housing 69 (Figs. 3 and 5). A hand wheel 70 is fast to the shaft 64 and a handle 71 is provided at the end of the shaft 72, which latter is coupled, as at 74, to the shaft 73. The shaft 72 revolves in the bracket 75 fastened upon the stud 76 screwed into one of a series of holes of the segmental bracket 77, fast upon the yoke 6 (Fig. 6). The clutch member 67 is slipped upon the shaft 73 by the handle bar 78 fast to the rock-shaft 79, mounted under the ties 9 and 10 which unite yoke 6 to the frame E. To the rock shaft 79 are fastened the rocker-arms 80 and 81 which carry at their lower ends a knocker-shaft 82 adapted to strike against the handle-bars 84 and 85, which are pivoted at 86 and 87, respectively, and are jointed to the clutch members 57" at the front of the machine and the clutch member 55" at the rear of machine, respectively. The friction pulley 60 on the shaft 59 is hooded by the friction strap housing 88 and the friction pulley 61 on the shaft 58 has the friction strap housing 89. The housing 89 (Fig. 22) is pivoted at 90 to the bracket 97 fast upon the tie 7 between yoke 6 and frame E. At 91, one end of the friction strap 98 is secured, the other end being held at 92 of the housing 89. The housing 89 terminates in front, and on its forward projection carries a nose 93, against which a dog 94 may abut, the latter being controlled by a handle 95 fastened to a stud held by the bracket 110. Detachable weights 96 are placed upon the front part of the housing 89.

99 and 100 (Fig. 6) are shipper levers fastened upon the shaft 101, extending across the yoke 6, to which is fastened lever 102, pivotally connected by the link 103 to the shipper slide 104, which carries the belt fork 105 for operating the machine (Figs. 3, 6, and 8).

The operation of the machine is as follows: The cloth to be operated upon may be placed either in a fold before the machine or put upon one of the lap rolls placed at the bottom of the machine, and wound either face to face with a second piece of cloth, or may be wound with an apron upon a roller, as at 11, on top of the frame E and resting in the bearing 12 at one end of the machine and in the socket 13 at the other end of the machine. The socket 13 (Fig. 18) carries a projection 13''', which forms a shelf or receiving guide immediately in front of the square opening or hole 111, of the socket 13, into which hole may be inserted the square end 112 of steaming roll 11 (Fig. 23); or if it be desired to roll the cloth upon a lap-roll instead of a perforated steaming roll, the square end 112' of a square lap-roll bar (Figs. 19 and 25) can be slipped into this opening 111. To accomplish this it is necessary to throw open the bearing 12 which consists of two parts pivoted together and locked by a pin when closed, as shown in Figs. 1, 11 and 12. To insert a steaming roll of the type 11 shown in Figs. 4, 7 and 23, it is placed so that the collar 113 thereof lies outside of the bearing 12 while the head of the steam-roll itself forms a shoulder against the inside of the bearing 12. Similarly, if it be desired to employ a lap-roll having a lap-roll bar such as shown at Fig. 19 and Fig. 25, the collar 113' of the lap-roll-bar is placed so as to fall outside the bearing while the square shoulder 138 of the bar lies inside of the bearing. Now, by turning the handle 114 upon the screw or spindle 115 which connects with the threaded portion of the bearing 12 directly below the slide 116, the bearing may be moved. The hand wheel 70 upon the shaft 64 through the pinion 65 which meshes with the gear 66, controls (when the clutch members 66' and 67 are coöperating) the socket 13 upon the shaft 73 (Fig. 7) so that by turning the hand wheel slightly in one direction or the other, its receiving guide 13''' may be brought to face upward for the receipt of the square end of either a steaming-roll or a lap-roll-bar. The bearing 12 which is to hold the other end of the steaming roll or of a lap-roll-bar will, of course, be slid out until that part of the bearing 12 which forms a screw connection with the spindle 115, abuts against the bracket 118. By throwing open the bearing 12, as in Fig. 12, and then closing it as shown in Figs. 1 and 11, after placing the cylinder 11 or lap-roll-bar into it, it may be moved inward and toward the opposite end of the machine by turning handle 114 until that portion of the bearing 12, which forms a screw connection with spindle 115, abuts against frame E, as shown in Figs. 4 and 7, whereupon the square end of the roll 11 or 112 of the lap-roll-bar will enter into the square opening 111 of the socket 13, so that when the shaft 73 is revolved in either direction by the hand wheel 70, or by the power mechanism for winding upon it cloth or apron, there is no possibility of the roll becoming loose, because the screw connection 114 of the bearing 12 will always maintain it in proper position until ready for removal.

The bearings 16 at the lower end of the machine may be handled precisely as the bearing 12, by handles 119 controlling the spindles 120, which form screw connections with the bearing 16 at 121 (Fig. 8). The slides of the bearings 16 are held in position by gibs 122, the bearing being made to open and shut for the receipt of a lap-roll-bar similar to bearing 12 (Figs. 1 and 15). The opposite end of the lap-roll-bar will be held by socket 17 on shaft 58 or 59 in the same manner as described for the socket 13 (Fig. 7). Thus the insertion or removal of a lap-roller into or from this bearing is as readily accomplished and the roll as securely held, as in the case of the roll or cylinder at the upper end of the machine. The only difference in construction being that the slides of the bearings 16 move in a vertical plane instead of in a horizontal plane.

When wishing to introduce the cloth, the operator, by turning handle 34 upon the shaft 33, which carries worm 35 engaging with worm-gear 36 fast on shaft 37, will throw up bracket 22 until it is in position shown in Fig. 17, when the end of the cloth can be slipped in between bar 41 and shaft 37, the end dropping down until it strikes the inclined surface of the gird 5 at the upper front end of the machine. The carriage 18 will then stand in the position shown in Fig. 1. Then, by turning the hand wheel 27' at the end of shaft 27 (held by the bracket 29 of the carriage 18) for one-half revolution, the supplemental carriage 19 carrying the stretcher roll and friction-bar arrangement, can be moved from the position shown in Fig. 17 to that shown in Fig. 16, so as to create an opening between pressure roll 23 on carriage 18 and spreader roll 20 on supplemental carriage 19, which enables the operator to pick up the end of the cloth hanging from the inclined surface of gird 5 and pass it upward between the pressure roll 23 and the stretcher roll 20 until the end can be placed between the pressure roll 23 and steaming roll 11.

Immediately before introducing the end of the cloth, the end of an apron on roll 14, for instance, has been slipped around pressure roll 23 and lapped around steaming roll 11 until the end has been caught between these two rollers, and a lap started, whereupon the end of the cloth may be lapped together with the apron around roll 11. As soon as the end of the cloth has been secured on steaming roll 11, the hand wheel 27' is once more turned until the carriage 19 sliding on carriage 18, is in the position shown in Fig. 17 or Fig. 1. The cloth is then pulled back a little by the operator to take up any slack in it, and by turning handle 34 in the opposite direction to that to raise the bracket 22, the latter with its bars 40 and 41 descends and is then brought into the position shown in Figs. 1 and 16, so as to frictionally engage the cloth with a tension which may be varied at will by operating handle 34. With the same facility, when wishing to introduce the end of the cloth or of an apron between rolls 23 and steaming-roll 11, a suitable opening or space between these two rolls may be created, by simply turning hand wheel 24' to the right, thus operating the rack and pinion arrangement of carriage 18. The carriage 18 has fastened on its inner side a bunter 125, which when the wheel 24' is turned to the right will strike against the hub of the pinions 25 and thus prevent the carriage from slipping off its ways.

While the cloth is being stretched in width when going around stretch-roll 20 in passing to the pressure-roll 23, the apron is spread by the scroll-roll or spreader 42 immediately below the pressure-roll 23. This spreader or scroll-roll 42 which is hung in brackets 43 fastened to the carriage 18 (Figs. 1 and 2) has threads cut upon its circumference diverging from the center toward the ends, but on one-half of the roll 42 the threads wind downward from the ends toward the center, as in Fig. 20, and on the other half the threads wind upward from the ends toward the center, as is shown in Fig. 21, so that these threads must act in opposition to the direction of the run of the apron. The ends of the scroll-roll 42 have lugs 45 which will abut against the stops 44 on the bearings 43, in which the scroll-roll revolves so that when the apron passes in an upward direction, it will run against the outwardly acting threads of the first half of the scroll-roll, as in Fig. 20; and if the apron runs in an opposite direction (that is to say, from roller 11 down toward roller 14), it will run against the outwardly acting threads of the second half of roller 42. The stops 44 and 45 abut irrespective of the direction of travel of the apron, but in such a manner as to always present the properly spreading threads of the scroll against the apron, thus always removing wrinkles from the apron, whatever the direction of the movement of the apron might be.

In Figs. 1, 4, 7 and 23, the steaming-roll 11 has at each end regular gudgeons which end at one side with the collar 113 and at the other with the square 112. But the steaming roll may also be constructed, as shown in Fig. 27, without any gudgeons whatsoever and wide open heads at both ends; or, as in Fig. 29, with one wide open head and the other end provided with a head similar to that in the steaming roll shown in my pending application No. 272121, filed July 31, 1905, ending in a square 112, precisely as shown in roll 11 first here referred to and described. When using the last style steaming roll, the bearing 12 of my machine remains of the same construction as before, except that its upper half carries a hump or camel back 12′ which has hinged at its top a swing hook 12″. When placing the roll into the machine, the end with the head 113 and square 112 to it, rests upon shelf 13″ of socket 13, while the opposite wide open head rests upon shelf 130 fast to frame E. Within the opening of the bearing 12, however, when it is closed, is held a plunger 126 whose tapered head fits into the tapered opening of head 113 of the steaming roll, when the handle 114 which moves the bearing 12 is turned sufficiently to engage this plunger with the steaming roll head. By continuing to turn handle 114, the square 112 is next forced into the square opening 111 of the socket 13, and the roll can then be set in motion through the shaft 73, the plunger 126 at the opposite end revolving freely in bearing 12. When it is desired to take out the steaming roll, the swing hook 12″ of bearing 12 is thrown over until it engages with the inner rim of head 131 so that when handle 114 is turned to draw back bearing 12, it will take along also the steaming roll. As soon as its square end 112 is withdrawn from the opening 111 in socket 13, until it rests only on the receiving shelf 13‴, the hook 12″ is disengaged and thrown back. By continuing to turn the handle 114, the plunger 126 is withdrawn from the open head 131, leaving the roll in the position shown in Fig. 29 ready for removal resting on shelves 13‴ and 130.

In Fig. 27, the operation for inserting or removing the steaming roll would be the same, except instead of using the socket 13, with its shelves 13‴, I employ a toothed or gear-rimmed plunger 126′ fast upon shaft 73 to engage with the internally toothed or gear-rimmed surface 131′ of the open head 131, of the steaming roll, while the weight of the steaming roll is upheld by the shelves 130′ directly underneath, the opposite end resting upon shelf 130, as before.

In the use of steaming cylinders, it has heretofore been customary to wind several layers of wrapper-cloth around the steaming roll before starting to lap on the apron, or the cloth to be treated. Such wrapper is mainly employed so that the perforations in the steam cylinder may not make impressions in the cloth during treatment, and after steam has been passed through this wrapper once or twice it sticks to the roller, and remains easily in position for a long time to come. Hence when a wrapper is employed on the roll, it is comparatively easy when lapping on an apron or cloth, to start such apron or cloth in a proper manner, by simply lifting the end of the wrapper on the cylinder and tucking the fore-end of the apron or cloth under it. The cloth or apron being thus held at one end may then be easily wound on without the liability of slipping. Such, however, is not the case where an ordinary smooth wooden lap-roll, having no perforations in its periphery, is employed, as there is no hugging surface or means whereby the cloth may frictionally engage with the roll. In such a case, it is quite difficult to properly start a good lap for cloth or apron owing to constant slippage. In order to enable one to do so I provide a lap-roll having a segmental or sectional lag which forms a part of the periphery of the roller and which is hinged to the main body of said roller. This lag may swing open and shut, so that the end of the apron or cloth may be caught at the edge, and secured between the swinging lag and the body of the roll. In this manner an absolutely smooth, square and secure lap may be started. Where the old smooth lap roll is used, even where one has succeeded in starting an even, square lap, it frequently happens that when friction is placed upon the cloth or apron, the roll will turn within such lapped cloth or apron and thus fail to carry it as it should. With my improved lap roll, the possibility of slipping between the roll and the cloth is obviated, and the cloth will be wound evenly and smoothly until the end is reached. The swinging lag may then be opened to permit the end of the cloth or apron to be withdrawn from the roll. This feature of my roll is shown clearly in detail in Fig. 26. Another feature is that the heads of my lap roll upon which the lags are fastened are cup-shaped in two directions so that when inserting the squared end of the carrier-bar no difficulty is experienced in guiding the squared end to the square opening in the head. This is particularly desirable after the square of the carrier bar has been passed through one head into the interior of the roll and is ready to reach the second or farther end of the roll. It is thus easy to enter the second head, or end of the bar in the cup-shaped socket therefor.

When starting a lap of cloth upon the steaming cylinder, the operator usually stands at the rear of the machine and leans against the gird 4, and bends over the steaming roll to see that the end of the cloth is properly tucked under the following cloth or apron. In doing this, the operator is obliged to smooth the end of the cloth or apron, to prevent wrinkles, for if a wrinkling of the material occurred, and were permitted to remain during the steaming process, such wrinkles could not be removed unless the cloth were thoroughly rewashed, thus involving a costly process. Hence, a smooth start is of great importance in forming a lap of the cloth or apron.

It will be noticed that the hand wheel 70 upon the shaft 64 is in close proximity to the end of the steaming roll, so that the operator may turn it and yet keep his eyes and other hand on the roll, upon which he wishes to start a lap. Without this hand-wheel arrangement he would be obliged to go to the driving end of the machine and grasp and partly turn the driving pulley to make a start, and if after inspection of a started lap he found it smooth and even, he could then shift his belt to start the machine. If upon inspection he discovered a bad start, he would have to turn the pulley back again and begin all over.

By constructing my machine so as to bring the shaft 64 to the rear, and by extending the same inward over the frame E, and supplying the same there with a hand wheel, I provide means for the operator to start a lap on his roll without going away from it and keep it under constant inspection. This enables the user to dispense with the services of an extra man to help him make the start. Not only is this arrangement exceedingly convenient for starting the roll, but it has other advantageous functions. When placing either a full or an empty roll in its bearings, whether on the upper part of the machine, or on the lower part thereof where the apron rolls are usually mounted, this hand wheel saves time and effort in that it makes it possible to always present the receiving shelves of the bearing sockets in position to receive the squared end of either the roll or the carrier bars, which carry the apron rolls or the lap rolls. Were it not for this arrangement, it would be necessary for one person to stand at the driving end of the machine in order to turn the driving pulley in whatever direction the operator instructed, to bring the open side of the receiving shelves uppermost. Again, I can turn the roller 11, when placed in its bearings, by turning the handle 71 on the shaft 72 which is coupled at 74 to the clutch shaft 73. When throwing the clutch 67 on the shaft 73 out of mesh with its mate 66', as shown in Figs. 3 or 7, the turning of the handle 71 will cause the socket 13 to revolve in whichever direction the operator desires. This second arrangement for turning the shaft 73 and consequently the steaming roll 11, is employed only for unrolling either two pieces of cloth that have been rolled face to face without an apron, as indicated in the diagrammatic view Fig. 9, or a single piece of cloth, that has been wound on the steaming roll without an apron.

When a steaming roll upon which a piece of cloth has been wound together with the apron, is returned to the machine for the purpose of unwinding, after the steaming process, the operator proceeds by first taking the end of the apron and attaching it to a lap roll 14 at the lower part of the machine, he then starts the machine by shifting the belt from the loose to the fast pulley which causes the apron to be continuously wound upon the roll 14, at the same time freeing the cloth above. As shown in Figs. 9 and 10, I may locate one or more rollers, such as shown at X and Y, preferably near the ceiling, which rollers run continuously in the direction of the arrows. One end of the cloth may be thrown over one of these rollers while the apron is being wound upon the roll 14. The rolls X and Y have smooth surfaces and revolve at a velocity somewhat greater than the speed that the cloth would have when a full roll is being unwound, so that these rollers X and Y can always take care of the amount of cloth to be unwound. When no apron is used, and when either one piece of cloth, or two pieces of cloth placed face to face, are to be unwound, as shown in Fig. 9, then the steaming roll must be turned by the handle 71.

The arbor 76 carrying the bracket 75 which forms the end bearing of the shaft 72 can be screwed into any one of the five holes arranged in an arc in bracket 77, fast to the yoke 6. This is done in order to let the belt, which drives the machine, come from different directions without rubbing or wearing against the arbor, for moving the arbor from one hole to another, still keeps the end bearing in the bracket 75 central with the bearing of shaft 73 to which the shaft 72 is coupled at 74. This arrangement frequently saves the putting up of a counter-shaft overhead to avoid the belt hitting the bracket, if the latter be fixed and not adjustable.

The description given of Fig. 22 regarding the friction strap 98 with its housing 89, which strap may be released from contact with the pulley 61, instantly, of course applies to the same kind of arrangement for the pulley 68 on the shaft 73 and the pulley 60 on the shaft 59, the object being to promptly release all friction by a quick motion of the handle, and to as promptly put on the friction, when needed, and which may be regulated by the use of weights 96. Where friction clamps have been employed, the friction frequently varies and it is difficult to maintain it at the same degree. Moreover, it takes more time to release or apply the friction. With my arrangement, all three frictions of my machine can be thrown either in or out, in less time than it takes to adjust one friction of the old type. Likewise, my clutch arrangement is a great improvement over that heretofore in use, for when throwing the clutch of the steaming roll shaft into mesh, the clutches of the lower or apron rolls are simultaneously thrown out, and when the latter are thrown into mesh, the upper or steaming roll clutch is automatically thrown out. This avoids all possible chance of accidents to either cloth or apron being torn in two, which I have known to happen with other apparatus lacking in this respect.

Fig. 1 shows my machine with the steaming roll 11 practically empty, a lap having just been started upon it and the cloth being fed to it (as indicated by broken lines and arrow) from a folded pile on the floor or from a roll 15 placed in bearings 16 in front, while the roll 14 in the rear carries a full length apron that is being transferred together with the cloth to the roll 11.

Fig. 2 shows the machine with the steaming roll practically loaded and the carriage 18 consequently pushed out to its very limit. Yet it will be noted, that the spreader-roll 42 at all times maintains its spreading action upon the apron irrespective of the diminished or increased diameter of either the apron roll or the steaming-roll. And this is true, when the direction of rotation of either of these rolls is reversed. In other words, there is never a time in the operation of the machine when the apron is not subjected to the constant spreading action of the spreader roll; coming or going, the apron is kept uniformly smooth or free from wrinkles. I call 23 the pressure roll because it always, in the operation of the machine, lies up against the steaming roll. Though the carriage 18 slides very smoothly and easily upon the frame E carrying, as it does, the roll 23, the second carriage 19, the stretcher roll 20 and friction bar arrangement upon brackets 21 and 22 add a very considerable weight to it, which the swelling roll of cloth upon the steaming roll 11 has to overcome and push back as the roll increases in size. This is all the pressure necessary for winding a good solid roll. Should in exceptional cases, more pressure be required, I can throw a friction strap, not shown in the drawings, around hand wheel 24' to increase this pressure *ad libitum*.

While I have herein shown and described a machine from which the roll of cloth is adapted to be removed and to be steamed in a separate steaming apparatus, I wish it to be understood that I do not limit myself to any such construction, as it will be evident that the steaming may be accomplished on this machine. That is to say, the perforated roll or cylinder may remain upon the machine, and by simply boring the shafts and to render the same tubular in form and by connecting such tubular shaft with a suitable source of steam, the steam may be conducted to the interior of the roll containing the cloth, and issue through the perforations thereof for the purpose of steaming such cloth. It will be further evidenced that changes in details and proportions may be made without departing from the spirit of my invention or exceeding the scope of the claims.

I believe that I obtain a more compact, solid, firm and uniform roll than has heretofore been possible by reason of the fact that I provide what I may term a "cloth-delivery-mechanism." Heretofore, in cloth winding or rolling machines, the cloth has run over guides to the roll but, so far as I know, in no case has any cloth-delivery mechanism as such been provided, the particular function of which is to guide and deliver the cloth to the roll under such conditions as to control the make up of the roll.

My cloth-delivery-mechanism in its preferable form, as shown in the drawings, is mounted upon the carriage 18. Its delivery member 23 is shown as having its position controlled on the one hand by the growth of the roll and on the other hand by the tension on the cloth. Thus, it will be seen that the roll 23 and its carriage 18 are shoved back by the growth of the roll while the tension on the cloth due to its friction on the bars 37, 38, 39, 40 and 41, or both tensions, tends to thrust the roll 23 and its carriage 18 forward. This produces a cloth-delivery-mechanism which is automatically regulated by the growth of the roll and the tension on the cloth or apron, or both; the result being that the firmness or solidity of the roll is uniform and may be regulated by the operator by simply regulating the tension. By having the tension bars 37, 38, 39, 40 and 41 located as shown and as preferred so as to be shoved back by the growth of the roll with the delivery member 23, I still further facilitate the required control.

Although I have shown a reciprocating slide 18 as the carriage whereby the delivery roll 23 is held subject to the growth of the receiving roll in antagonism to the forward pressure exerted on the pay-out roll 23 by the tension on the apron or on the cloth, or on both, I do not wish to be understood as limiting myself to a sliding carriage or a reciprocating carriage since I am aware that the carriage may be in any form which will hold the delivery roll 23 subject to forward or backward movement under the balance of forces referred to.

Having thus described my invention, what I claim is:

1. The combination of a frame, a cloth-receiving roll upon which the cloth is to be wound, a carriage, a presser roll carried by said carriage, a second carriage on the first-named carriage, a stretcher roll on the second carriage, and means for shifting both of said carriages back and forth.

2. The combination of a frame, a cloth-receiving roll upon which the cloth is to be wound, a carriage movable toward and away from the cloth-receiving roll, a presser roll carried thereby, a second carriage, a tension device on the second carriage, and means for shifting both said carriages.

3. The combination of a frame, a cloth-receiving roll upon which the cloth is to be wound, a movable carriage movable toward and away from the cloth receiving roll, a presser roll carried thereby, a second carriage and a stretcher roll and a tension device upon said second carriage, and means for shifting both said carriages.

4. The combination of a frame, a cloth-receiving roll upon which the cloth is to be wound, a carriage movable toward and away from the cloth receiving roll, a presser roll carried by said carriage, a second carriage, a stretcher roll on the second carriage, and means for shifting both of said carriages back and forth.

5. The combination of a frame, a cloth receiving roll upon which the cloth is to be wound, a movable carriage, a presser roll carried thereby, a second carriage mounted on the first mentioned carriage, a stretcher roll on the second carriage, and a tension device on the carriage adjacent to the stretcher roll.

6. The combination of a frame, a cloth receiving roll upon which the cloth is to be wound, an apron roll, means whereby the travel of the cloth and apron may take place in either direction, and a spreading device interposed between the apron roll and the cloth roll and adapted to spread said apron irrespective of the direction of travel of said apron.

7. The combination with the frame, of a plurality of cloth rolls mounted thereon, means for unwinding the cloth from one roll and winding it upon another, a presser roll movable to and from one of said cloth rolls and a stretcher roll movable toward and away from the presser roll.

8. In combination, a cloth-receiving roll, a cloth-supply roll, a spreading device mounted between said rolls, said device having oppositely scored surfaces adapted to be presented singly to the cloth to spread the latter irrespective of the direction of travel of the cloth, and means whereby the spreading device is shifted by the engagement of the cloth therewith to present one or the other of the scored surfaces to the cloth according to the direction of travel of the cloth.

9. The combination with the frame, of a plurality of rolls mounted thereon whereby the material may be unwound from one of said rolls and wound upon the other, a stretcher roll mounted upon the frame, a carriage for the stretcher roll, a presser roll, and means for shifting the position of the carriage to move the stretcher roll toward and away from one of the cloth rolls.

10. The combination with the frame, a cloth-receiving roll, a presser roll to press the cloth against the receiving roll, a stretcher roll adjacent thereto and movable toward and away from the presser roll, a spreader beneath the presser roll and a friction device above the spreader roll.

11. In a cloth winding machine, in combination with a driven receiving roll, a cloth delivery mechanism consisting of a delivery roll, a tension device, a support for said delivery roll, and means whereby the position of the support is controlled by the growth of said receiving roll and the tension upon the cloth.

12. In a cloth-winding machine, in combination with a driven receiving roll, a cloth-delivery-mechanism consisting of a delivery-roll bearing against the cloth-roll, a support for the delivery-roll admitting of its being shifted by the growth of the cloth-roll, and a tension device adapted to act upon the cloth, and means whereby the tension produced on the cloth opposes said backward movement.

13. In a cloth winding machine, in combination, the driven receiving roll, a cloth and apron delivery mechanism consisting of a cloth and apron delivery roll bearing against the receiving roll and adapted to be shoved backward by the growth of said receiving roll, an apron tension device and a cloth tension device; one of said tension devices tending by the tension produced on the web engaged thereby to thrust said delivery roll against the receiving roll.

14. In a cloth winding machine, in combination, a driven receiving roll, an apron tension device, a cloth tension device and a delivery roll over which the apron and cloth are paid out to said receiving roll and a support for said delivery roll admitting of the backward movement of the delivery roll as the receiving roll grows.

15. In a cloth winding machine, in combination with a driven receiving roll, a cloth delivery mechanism consisting of a carriage upon which is mounted a delivery roll bearing against the receiving roll and a tension mechanism adapted to act on the cloth whereby the delivery roll is pressed forward in antagonism to the growth of said receiving roll by the tension produced on the cloth.

16. In a cloth winding machine, in combination with a driven cloth receiving roll and an apron, a cloth and apron delivery mechanism consisting of a carriage upon which is mounted a delivery roll bearing against the receiving roll, and a tension mechanism whereby the delivery roll is pressed forward in antagonism to the growth of said receiving roll.

17. In a cloth winding machine, in combination with a driven receiving roll, a cloth-delivery-mechanism consisting of a carriage upon which is mounted, a delivery roll bearing against the cloth receiving roll, a stretcher, and a tension mechanism, whereby said carriage and the delivery roll, stretcher and tension mechanism are shoved back by the growth of the receiving roll.

18. In a cloth winding machine, in combination with a driven receiving roll, a cloth-delivery-mechanism consisting of a carriage upon which is mounted a delivery roll bearing against the cloth roll and a cloth tension mechanism and a supplemental carriage carrying a stretcher.

19. In a cloth-winding machine, in combination with a driven receiving-roll, a cloth-delivery-mechanism consisting of a delivery roll free to be moved backward by the growth of said receiving roll, a cloth tension mechanism adapted to produce tension on the cloth to tend to move the delivery-roll forward, and means whereby said tension may be adjusted to vary the pressure of said delivery-roll against the receiving-roll.

20. In a cloth winding machine, in combination with a receiving roll, a cloth-delivery-mechanism consisting of a delivery roll bearing against the roll of cloth and free to be shoved backward as the roll grows, a cloth tension mounted to be moved backward by the backward movement of said delivery roll.

21. In a cloth winding machine, in combination with a receiving roll, a cloth-delivery-mechanism consisting of a delivery roll bearing against the roll of cloth and free to be shoved backward as the roll grows, a cloth tension mounted to be moved backward by the backward movement of said delivery roll, and a stretcher interposed between said delivery roll and said tension.

22. In a cloth winding machine, in combination with a receiving roll, a cloth-delivery-mechanism consisting of a delivery roll bearing upon the cloth roll and free to be moved backward by the growth of the cloth roll, an apron tension and an apron extending around said delivery roll in such direction that its tension presses the same against said cloth receiving roll.

23. In a cloth-winding machine, in combination, a fixed frame, fixed receiving roll bearings upon the top of the frame, a cloth delivery mechanism and a carriage therefor mounted upon and movable on the top of said fixed frame, and means to move the delivery mechanism toward and away from the receiving roll bearings.

24. In a cloth winding machine, in combination, a frame, the bearings of a cloth receiving roll thereon, a cloth-delivery-roll having its axis in approximately the same horizontal plane with the cloth receiving roll, a support for the journals of said cloth-delivery-roll admitting of its being thrust backward by the growth of the cloth roll and a tension mechanism adapted to tension the cloth being wound whereby said cloth-delivery-roll is pressed forward by the tension produced on the cloth.

25. In a cloth winding machine, in combination, a frame having a substantially horizontal top, receiving roll bearings mounted thereon, a carriage free to move thereon toward and from said bearings, a cloth-delivery-roll mounted on said carriage and tension mechanism adapted to tension the cloth being wound whereby said delivery-roll is pressed against the cloth roll by the tension produced on the cloth.

26. In a cloth-winding machine in combination, a frame having an overhanging front, cloth-roll-bearings beneath said overhanging front, cloth-receiving-roll-bearings mounted upon the body of the frame, a cloth-delivery mechanism mounted upon said overhanging front and free to move in a horizontal line on the frame to and from said bearings, and means for positively moving said mechanism.

27. In a cloth winding machine, in combination, a frame having an overhanging front, cloth receiving roll bearings mounted upon the body of said frame, cloth supply roll bearings mounted beneath said overhanging front and a cloth-delivery-mechanism mounted upon said overhanging front and free to move toward and from the receiving roll.

28. In a cloth winding machine, in combination, a frame having an overhanging front and rear, cloth receiving roll bearings mounted upon the body of said frame, cloth supply roll bearings mounted beneath said overhanging front, apron roll bearings mounted beneath said overhanging rear and a cloth-delivery-mechanism mounted upon said overhanging front with freedom of movement toward and from said receiving roll.

29. In a cloth winding machine, in combination with a receiving roll, a cloth-delivery-mechanism consisting of a pay out roll bearing against the receiving roll, a carriage permitting the same to be shoved backward by the growth of the roll, tension bars as 37, 41 and 48 between which the cloth runs and means whereby the intermediate tension bar may be moved to permit of the introduction of the cloth.

30. In a cloth winding machine, in combination with a driven receiving roll, a cloth-delivery-mechanism consisting of a delivery-roll bearing against the cloth roll and free to be shoved backward by the growth thereof, a stretcher roll and a tension bar 41 and separate means whereby said stretcher roll and bar may be moved bodily to admit of the introduction of the cloth.

31. In a cloth winding machine, in combination, the frame, the cloth roll end bearings, a carriage whereby said bearings may be separated to detach the ends of the roll from the bearings and a rest for supporting both ends of the roll between the separated bearings when detached from the latter.

32. In a cloth winding machine, in combination, the frame, the cloth roll bearings, a carriage whereby said bearings may be separated and an extractor for moving the roll longitudinally to extract it from its bearing.

33. The combination with the frame and a cloth roll mounted therein, of a bearing for supporting the roll, said bearing being adjustable longitudinally of the roll, and means for moving the roll longitudinally with the bearing.

34. The combination with the frame and a cloth roll mounted thereon, of a stationary bearing in which one end of the roll is detachably mounted, and a movable bearing for the opposite end of the roll, said movable bearing being movable longitudinally of the roll, and means for moving the roll longitudinally with the bearing to detach it from the fixed bearing.

35. In an apparatus of the class described, a roll, a fixed bearing for one end of the roll, a movable bearing for the other end of the roll, and means associated with said bearings, whereby a movement of the movable bearing moves the roll longitudinally to extract it from the fixed bearing.

36. In an apparatus of the class described, a roll, a fixed bearing for one end of the roll, a movable bearing for the other end of the roll, and means associated with the movable bearing for extracting the roll from the fixed bearing.

37. In an apparatus of the class described, a roll, a fixed bearing for one end of the roll, a movable bearing for the other end of the roll, and a hook associated with the movable bearing for engaging the roll to withdraw the same from the fixed bearing when the movable bearing is moved in one direction.

38. The combination with the frame and a longitudinally movable cloth roll, of a stationary bearing for one end of the roll having a socket portion and an open sided guiding portion for the reception of the roll shaft or gudgeon to guide the latter into the socket, and a movable bearing at the opposite end of the roll to longitudinally shift the roll to move the shaft or gudgeon into or out of said socket.

39. The combination with the frame, a cloth-receiving roll mounted thereon upon which the cloth is wound, a stretcher roll, a presser roll, and means for adjusting the stretcher roll relative to the presser roll.

40. The combination with the frame, a cloth-receiving roll thereon upon which the cloth is wound, a presser roll, a stretcher roll, and means for adjusting the presser roll and the stretcher roll relative to each other.

41. The combination of a frame, a cloth-receiving roll on the frame upon which the cloth is wound, a roll on the frame from which the cloth is unwound, a friction device and a delivery-roll interposed between the two rolls, and a reciprocating carriage on said frame for said friction device and delivery-roll movable toward and away from the receiving-roll.

42. In combination with the frame, a cloth receiving roll carried by the frame, a stretcher roll, a presser roll located between the stretcher roll and said cloth receiving roll, and means for adjusting the stretcher and presser rolls relative to said cloth roll.

43. The combination of a frame, a cloth receiving roll carried by the frame, a stretcher roll, a presser roll located between the stretcher roll and said cloth roll, and means for adjusting the stretcher roll relative to the presser roll.

44. In an apparatus of the class described, a roll, a fixed socket bearing for one end of the roll having a shelf associated therewith to support the roll and guide the same into the socket bearing, a movable bearing for the other end of the roll, having a swing hook to engage the roll to withdraw it from the fixed socket bearing.

45. In an apparatus of the class described, the combination with a frame, of a cloth-receiving roll, bearings for the roll removably engaged by the latter, and supporting means on the frame adjacent and beneath each of the bearings for supporting the ends of the roll when it is disengaged from the bearings.

46. In an apparatus of the class described, the combination with a frame, of a cloth-receiving roll, bearings for the roll removably engaged by the latter, and shelves on the frame adjacent and projecting beneath the bearings for supporting the ends of the roll when disengaged from the bearings.

47. In a machine of the class described, the combination of a frame, bearings thereon, a roll engaging element journaled in one of the bearings, a roll, a shelf for supporting the roll adjacent the bearings, and means for moving the roll engaging element to secure the roll and to lift the same clear of the shelf.

48. In a machine of the class described, the combination of a frame, bearings thereon, a plunger journaled in one of the bearings, a roll, a shelf for supporting the roll adjacent the bearings, and means for moving the plunger into engagement with the roll to lift the same clear of the shelf.

49. In a machine of the class described, the combination of a frame, bearings thereon, a plunger journaled in one of the bearings, a roll, a shelf for supporting the roll adjacent the bearings, and means for moving the plunger into engagement with the roll, said plunger and roll having co-acting faces so formed that the engagement of the plunger with the roll raises the latter clear of the shelf.

50. The combination of a frame, a receiving roll upon which cloth is to be wound, an apron roll, and a spreading device interposed between the apron roll and the receiving roll, said device having reversely arranged spreading surfaces on opposite sides thereof which are co-extensive with each other, and means whereby said device is reversible to spread the apron irrespective of the direction of travel of the apron.

51. The combination of a frame, a receiving roll upon which cloth is to be wound, an apron roll, and a spreading device interposed between the apron roll and the cloth roll, said device having reversely arranged spreading surfaces on opposite sides thereof which are co-extensive with each other, and means whereby said device is automatically reversible to spread the apron irrespective of the direction of travel of the apron.

52. The combination of a frame, a cloth roll adapted to have a cloth web wound thereon, and a roll from which the cloth is wound, and a spreading device interposed between said rolls and having reversely arranged spreading surfaces on opposite sides thereof which are co-extensive with each other, and means whereby said device is reversible under control of the cloth web to spread the web irrespective of the direction of travel thereof.

53. The combination of a frame, a receiving roll upon which the cloth is to be wound, a supply roll and a spreading device interposed between the supply roll and the receiving roll, said device having reversely arranged spreading surfaces on different faces thereof, and means whereby said device is shiftable under control of the cloth to spread the latter irrespective of the direction of travel of the cloth.

54. The combination of a frame, a roll adapted to have a web wound thereon and unwound therefrom and a spreading device acting on the web having reversely arranged spreading surfaces on different faces thereof, and means whereby said device is shiftable under control of the web to bring one of said surfaces into position to engage the web to spread the latter irrespective of the direction of travel of the web.

55. The combination of a frame, a receiving roll upon which the cloth is to be wound, an apron roll, and a spreading device interposed between the apron roll and the receiving roll, said device having reversely arranged spreading surfaces on different faces thereof, and means whereby said device is automatically shifted under control of the apron whereby to spread the apron irrespective of the direction of travel of the apron.

56. The combination of a frame, a receiving roll upon which the cloth is to be wound, an apron roll, and a spreading device interposed between the apron roll and the receiving roll, said device having reversely arranged spreading surfaces on different faces thereof, means whereby said device is automatically shifted under control of the apron whereby to spread the apron irrespective of the direction of travel of the apron, and stops to limit the movement of the spreading device.

57. In a cloth-winding machine, in combination with a driven receiving roll, a cloth delivery mechanism consisting of a delivery roll, a tension device, a support for said delivery roll acted upon by the growth of the receiving roll to move said delivery roll in one direction and means whereby the tension device moves said support in the other direction relative to the receiving roll.

58. In combination, a cloth-receiving-roll, a cloth-delivery roll, a spreader element rotatably mounted between said rolls and over which the cloth passes, said spreader element having reversely arranged spreading surfaces, means whereby said spreader element is reversible under control of the movement of the cloth, and means for limiting the rotation of the spreader element.

In testimony whereof, I have hereunto signed my name in the presence of two subscribing witnesses.

DAVID GESSNER.

Witnesses:
T. E. HARDENBERGH, Jr.,
OSCAR ASCHER.